Oct. 21, 1924. 1,512,805
E. ROUČKA
AUTOMATIC REGULATOR
Filed March 26, 1921  3 Sheets-Sheet 1
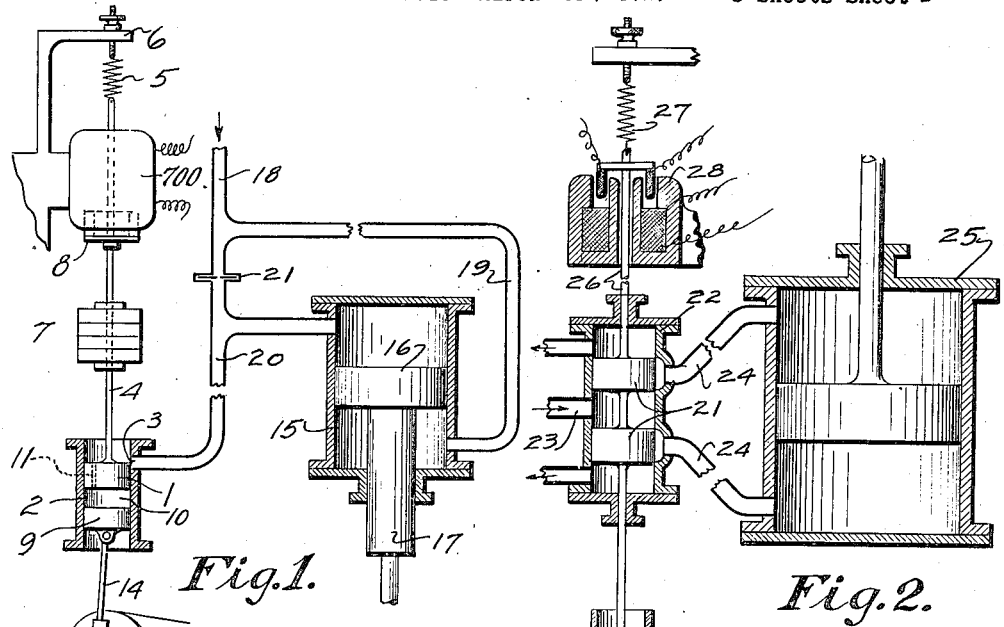
Fig.1.  Fig.2.
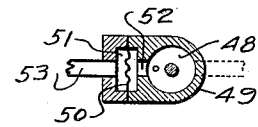
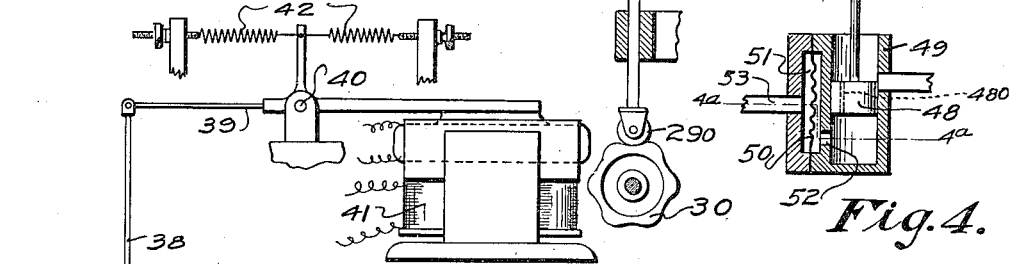
Fig.4.
Fig.5.
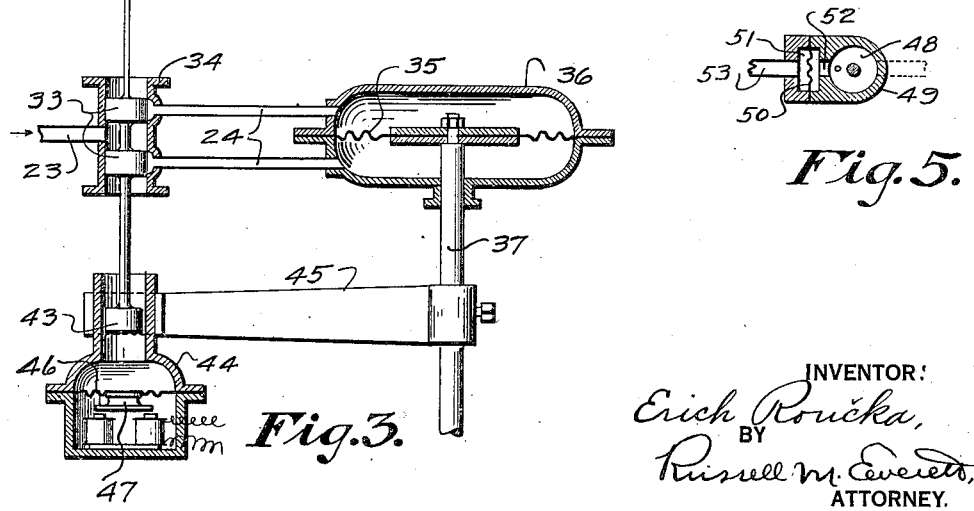
Fig.3.
INVENTOR:
Erich Roučka,
BY
Russell M. Everett,
ATTORNEY.

Oct. 21, 1924.  
E. ROUČKA  
AUTOMATIC REGULATOR  
Filed March 26, 1921  
1,512,805  
3 Sheets-Sheet 2

INVENTOR  
Erich Roučka,  
BY  
Russell M. Everett,  
ATTORNEY.

Oct. 21, 1924. 1,512,805

E. ROUČKA

AUTOMATIC REGULATOR

Filed March 26, 1921   3 Sheets-Sheet 3

INVENTOR:
Erich Roučka,
BY
Russell M. Everett,
ATTORNEY.

Patented Oct. 21, 1924.

1,512,805

UNITED STATES PATENT OFFICE.

ERICH ROUČKA, OF EAST ORANGE, NEW JERSEY.

AUTOMATIC REGULATOR.

Application filed March 26, 1921. Serial No. 455,974.

*To all whom it may concern:*

Be it known that I, ERICH ROUČKA, a citizen of the Republic of Czechoslovakia, and a resident of East Orange, in the county of Essex and State of New Jersey, have invented new and useful Improvements in Automatic Regulators, of which the following is a specification.

This invention relates to automatic regulators, and to measuring instruments of the balanced or compensating principle. The invention is applicable to regulators for controlling any quantities or qualities, physical or chemical, of a system by means of fluids. Such quantities and qualities may be electric current, voltage, watts consumption or production, and phase angle, and may relate to generators, boosters, rheostats and electric systems in general, the regulation of electric furnace electrodes, pressure of fluids, flow of fluids, and speed of motion regulation of prime movers, furnaces and the like.

The objects of the invention are to provide means for greatly increasing the sensitivity and accuracy of the controlling element beyond what has heretofore been possible by producing relative vibrations of the slidably cooperating parts by means of a vibrating fluid; to provide such means for increasing the sensitivity of the controlling element which operates independently of the controlling movements of the said controlling element; to provide improved means for preventing overthrow or hunting of the controlling element and for vibrating the slidably cooperating parts thereof, and to obtain other results and advantages as may be brought out by the following description.

My invention, in general, consists in increasing the sensitivity and accuracy of the controlling element by producing constant relative vibrations between the slidably cooperating parts of the same independently of the controlling movements of the said element, said vibrations being produced by mechanical or electrical vibrations of a fluid in contact with a part of the controlling element or the system which operates the same, thereby reducing the friction between the said slidably cooperating parts. The accuracy of the controlling element is also greatly enhanced by means for preventing overthrow or hunting of the controlling element.

The invention is adapted for use in regulator systems with or without a pilot motor, such as for example a piston in a cylinder, a diaphragm, float motor, rotatable motor, etc., in systems for controlling large amounts of power where a "relay" or governor motor is utilized, and where the characteristic of the system under control is to be maintained either constant in value or permitted to vary in a predetermined manner.

Referring to the accompanying drawings, in which like numerals of reference indicate the same parts throughout the several views, Figure 1 is a diagrammatic view of an automatic regulator system, showing the controlling element or governor valve vibrated by fluid interposed between it and an auxiliary piston reciprocated by an eccentric;

Figure 2 is a diagrammatic showing of the controlling element vibrated by a mechanically reciprocated dash pot;

Figure 3 shows another form in which the fluid in a dash pot is vibrated by an electric vibrator;

Figure 4 represents a modified form of fluid chamber for vibrating the governor valve;

Figure 5 is a horizontal sectional view taken on the line $4^a$—$4^a$ of Fig. 4;

Figure 6:
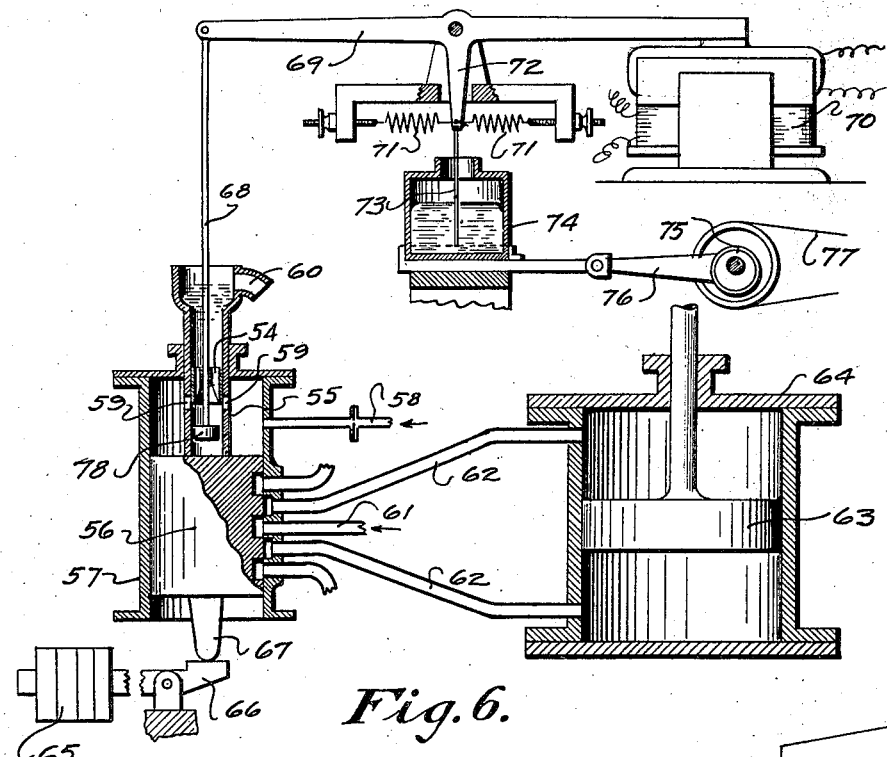
Figure 6 illustrates diagrammatically a regulator system in which the controlling element is adapted to indirectly control larger amounts of power, the controlling element being vibrated by agitation of a liquid which engages a part of the controlling system connected to the controlling element.

In Figure 1 of the drawings the invention is shown as applied to a regulator system comprising a single movable governor valve element 1 slidably mounted in a cylinder 2 said valve element controlling a port 3 in the wall of the cylinder. The valve element 1 is held by a rod 4 suspended by an adjustable spring 5 to a bracket or support 6, a counterweight 7 mounted on the rod 4 balancing the spring 5. The controlling movement of the valve element 1 relative to the port 3 is shown as produced by an electro-magnet or electro-dynamic device 700 adapted to actuate a core or secondary winding 8 mounted on the rod 4 to raise or lower the valve, said device being connected to the system under control.

The valve is constantly vibrated in the direction of the controlling movement thereof by the vibrations of a fluid contacting with the valve element. In the present instance a piston 9 is slidably mounted in the cylinder 2 beneath the valve 1 and in spaced relation thereto to provide a fluid space 10 therebetween and the valve is provided with a passage 11 to admit fluid to said space 10. The piston 9 is adapted to be constantly rapidly reciprocated in any suitable manner, as by an eccentric 12 driven by a belt 13 and connected to the piston by a connecting rod 14. The friction between the valve element 1 and cylinder 2 is thus substantially reduced so as to increase the sensitivity and accuracy of the controlling movement of the valve.

The valve element 1 controls the pressure of a fluid which actuates a fluid motor comprising the cylinder 15, piston 16 and piston rod 17, which may be connected to a rheostat, a furnace electrode, booster, etc. A fluid pressure supply pipe 18 has one end 19 connected to the cylinder 15 at one side of the piston 16, a branch pipe 20 having a throttling device 21 therein being connected to the cylinder at the opposite side of the piston, said branch pipe being also connected to the port 3 in the cylinder 2. With a normal flow of current through the device 700 the valve 1 is held in normal position partly uncovering port 3, allowing fluid to escape and maintaining piston 16 at rest. When the current increases the core or winding 8 is drawn in to raise the valve element 1 thus closing port 3 and limiting the escape of fluid therethrough. An abnormal flow of fluid then takes the course of least resistance through pipe 20 above the piston 16 and forces the same downwardly to operate the rheostat, etc., connected thereto. If the current decreases the reverse action takes place and the greater pressure of fluid passes through pipe 19 to the lower side of the piston 16 raising the same.

In Figure 2 I have shown a double valve element 21 slidable in a cylinder 22 and adapted to control the flow of fluid from an inlet pipe 23 through the pipes 24 to a fluid motor 25 substantially identical with the fluid motor above described. The valve element is carried by a rod 26 suspended on a spring 27 and actuated by an electro-magnetic or dynamic device 28 in response to variations in the system under control exactly as described in connection with Figure 1. In this form of the invention the valve is vibrated by a dash pot 29 containing a suitable fluid, such as oil, glycerine, water, etc., which is constantly rapidly reciprocated by a cam 30 engaging a roller 290 depending from the dash pot. The lower end of the valve has a piston 31 attached thereto and submerged in the fluid in the dash pot. As the valve is raised or lowered the fluid flows from inlet pipe 23 through one or the other of the pipes 24 to the fluid motor 25 and out through the other pipe 24 to the corresponding outlet pipe 32. The valve is constantly vibrated by the vibrating fluid in the dash pot 29 so that the friction between the valve element 21, rod 26 and cylinder 22 is substantially reduced. The dash pot 29 also serves to prevent overthrowing or hunting of the valve in either direction.

Figure 3 illustrates another application of the invention in which a double governor valve element 33 is slidable in a cylinder 34 to control the flow of fluid from an inlet pipe to opposite sides of the diaphragm 35 of a fluid motor mounted in a chamber 36 and having a rod 37 to be connected to a rheostat, furnace electrode, etc. The valve 33 is connected by a rod 38 to one end of an actuating lever 39 pivoted at 40 intermediate its ends, the other end of which carries a core or secondary winding of an electro-magnetic or dynamic device 41, which is adapted to oscillate the lever 39 in response to variations in the current passing therethrough to raise and lower the valve element 33. The lever is balanced by a pair of adjustable springs 42 connected to opposite sides of an arm projecting laterally from the lever at its pivot.

The lower end of the valve 33 has a piston 43 thereon slidable in a dash pot 44 mounted on an arm 45 carried by the rod 37 of the fluid motor. A diaphragm 46 is mounted in the dash pot below the plunger 43 and is constantly vibrated in any suitable manner as by an electric vibrator 47. The vibrations of the diaphragm 46 vibrates the fluid in the dash pot between itself and the plunger 43 so as to constantly vibrate the valve 33. When the valve element is raised to admit fluid over the diaphragm 35 of the fluid motor, the rod 37 descends lowering the dash pot 44 and tending to create a vacuum therein behind the plunger 43 to draw the valve downwardly to normal position, and when the valve lowers to admit fluid beneath the diaphragm 35 the dash pot is raised so that the fluid therein impedes the descent of the valve, thereby preventing overthrowing or hunting thereof in either direction.

In Figures 4 and 5 I have illustrated another application of my invention. The governor or controlling valve element 48 is slidable in a cylinder 49 having the lower end thereof closed, and controls a port in the cylinder. At one side of the cylinder is arranged a diaphragm 50 in a chamber 51, one side of which communicates with the closed end of the cylinder behind the valve through an opening 52. The other side of the diaphragm chamber is adapted to communicate through a pipe 53 with any suitable source of vibrating fluid, the said vibrating fluid serving to vibrate the diaphragm which in turn vibrates the fluid beneath the valve in the cylinder. The valve is formed with a passage 480 for admitting fluid into the cylinder behind the valve.

Figure 6 shows an application of my invention to a regulator system in which the governor valve indirectly controls large amounts of power through a "relay" or governor thus enabling the controlling element to be of small and delicate construction. The valve element 54 is hollow and slidable in a sleeve 55 connected to a governor 56 slidable in a cylinder 57, said valve element controlling the flow of fluid from a pipe 58 outwardly from the cylinder through ports 59 in the sleeve to an overflow 60 to control the movements of the governor 56 which in turn controls the flow of a fluid from inlet pipe 61 and pipes 62 to opposite sides of the piston 63 of a fluid motor 64, the governor 56 being counterbalanced by the counterweight 65 mounted on one end of a lever 66 pivoted intermediate its ends, the other end of which engages an arm 67 on the governor.

The governor valve 54 is connected by a rod 68 to an actuating system similar in construction to that shown in Figure 3, which comprises the lever 69 and electromagnetic or dynamic device 70. The lever 69 is balanced by springs 71 connected to opposite sides of an arm 72 projecting from the lever at its pivot. The arm 72 is formed with a vane 73 partially submerged in a fluid contained in a receptacle 74, the fluid being agitated in any suitable manner as by constantly horizontally reciprocating the receptacle by an eccentric 75 connected to the receptacle by a pitman 76 and driven by a belt 77. The reciprocation of the receptable 74 causes vibration or agitation of the fluid therein which vibrations are imparted to the vane 73 to oscillate the lever and vibrate the valve 54 in the direction of its controlling movement. The valve 54 has a plunger 78 mounted in the sleeve 55 which operates as a dash pot to prevent overthrowing or hunting of the valve and governor 56. The valve element 54 controls the movement of the governor 56 and the governor controls the flow of fluid to and from the fluid motor 64 exactly as described in my copending application Serial No. 455,973, filed March 26, 1921.

Figure 7:
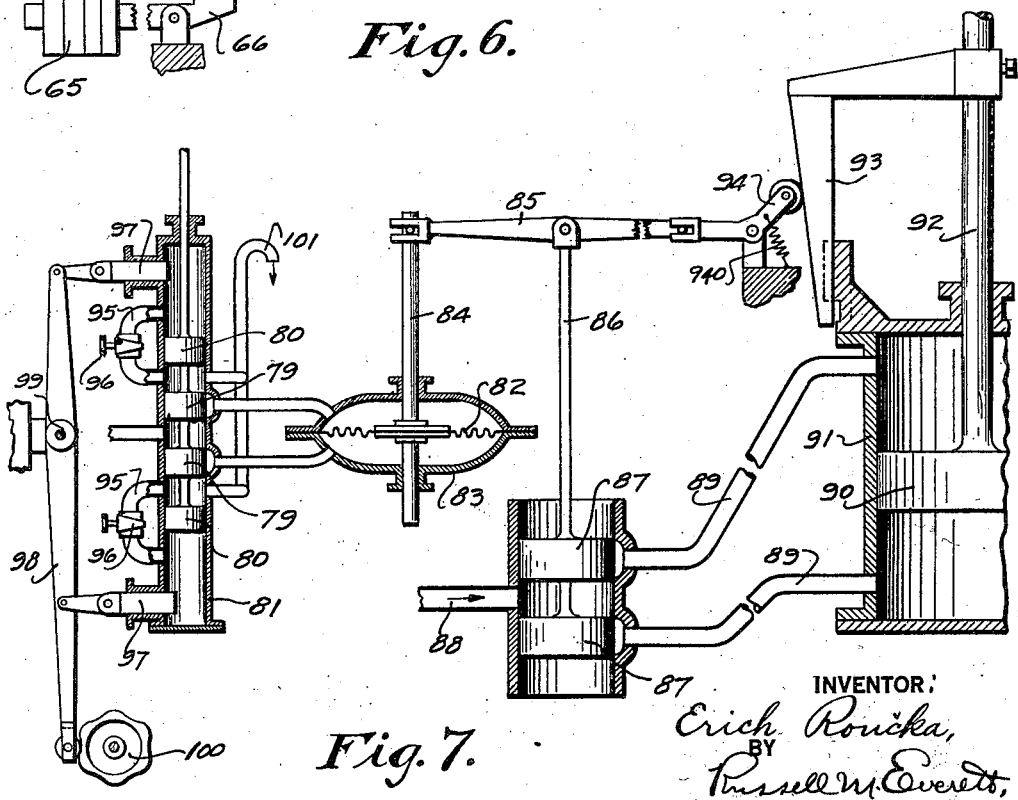
Figure 7 represents a similar system in which the governor valve is engaged at both sides thereof with a fluid vibrated by mechanically reciprocated plungers.

In Figure 7 another form of the invention is shown applied to a system similar to that shown in Figure 6. The double valve element 79 has spacedly connected at each end a piston 80 and is slidably mounted in a cylinder 81 to control the flow of fluid to and from opposite sides of a diaphragm 82 of a "relay" or governor motor 83 which actuates a rod 84 connected to one end of a governor lever 85 having connected thereto intermediate its ends a rod 86 carried by a governor 87 controlling the flow of a fluid from inlet pipe 88 through pipes 89 to opposite sides of the piston 90 of a fluid motor 91 which actuates a piston rod 92 having connected thereto a wedge arm 93 engaging one end of a bell crank lever 94 held thereagainst by a spring 940, the other end of which bell crank has a pin and slot connection with the other end of the governor lever 85 to actuate the same.

The cylinder 81 is filled between its ends and the pistons 80 with a fluid which may be admitted between the ends of the valve and the respective piston 80 through by-passes 95 controlled by manually operated valves 96. The said fluid is constantly vibrated by the rapid reciprocation of plungers 97 entering the ends of the cylinder and connected to a lever 98 at opposite sides of the pivot 99 thereof, the lever being oscillated in any suitable manner as by a rotating cam 100 engaging a roller at one end of the lever. The fluid between the ends of the valve and the pistons 80 may overflow through the overflow pipe 101. The rapidly reciprocating plungers 97 cause pulsations in the fluid in the cylinder which in turn vibrates the valve and pistons to reduce friction between them and the cylinder. The controlling movement of the valve 80 may be accomplished by any suitable means, such as for example those above described.

As the valve 79 is raised or lowered it permits fluid to flow to one side or the other of the diaphragm 82 and from the opposite side thereof out of the overflow pipe 101. This causes movement of the rod 84 and lever 85 to move the governor 87 to admit fluid to one side or the other of the piston or fluid motor 91. As the piston 90 falls the wedge arm 93 descends and through bell crank 94 tends to force the governor 87 downwardly, and when the piston 90 rises because of the governor 87 descending the wedge arm 93 tends to hold back the bell crank 94 to restrain descent of the governor 87, to ensure synchronous movement of the relay motor 83 and fluid motor 91. It will be noted that the fluid between the ends of the valve 79 and pistons 80 being vibrated, the fluid will also vibrate the diaphragm 82 which transmits the vibrations to the governor 87 thereby also reducing friction therein.

Figure 8:
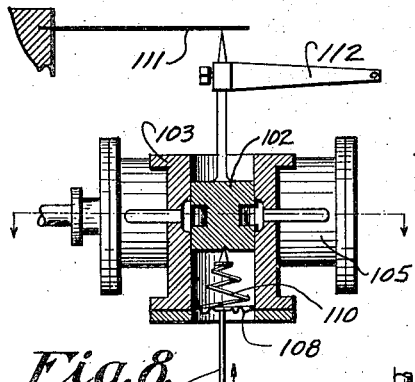
Figure 8 shows a rotary valve vibrated axially by vibrating fluid.
Figure 9:
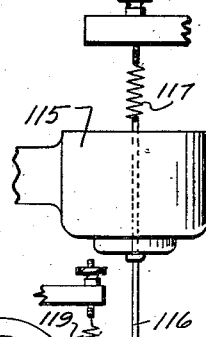
Figure 9 is a horizontal sectional view on the line 9—9 of Fig. 7.
Figure 9:
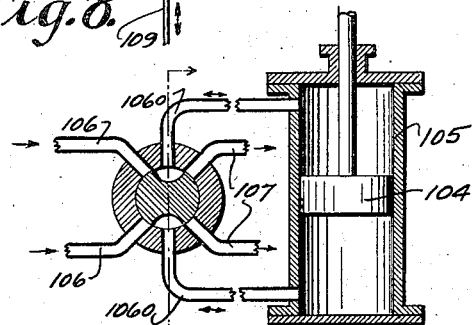

Figures 8 and 9 show another form of the invention applied to a rotary valve element 102 mounted to oscillate in a cylinder 103 and controlling the flow of fluid to opposite sides of the piston 104 of a fluid motor 105 from inlet pipes 106 and 1060 and from the motor through the pipes 1060 and outlet pipes 107. One end of the cylinder 103 is closed by a diaphragm 108 adapted to be vibrated by any suitable means through a rod 109 and the valve is balanced between a spring 110 interposed between the valve and diaphragm 108 and a spring strip 111, the oscillating controlling movement of the valve being produced by any suitable means through an arm 112. The constant rapid vibration of the diaphragm 108 causes vibrations in the fluid between the diaphragm and valve which vibrates the valve in an axial direction.

Figure 10:
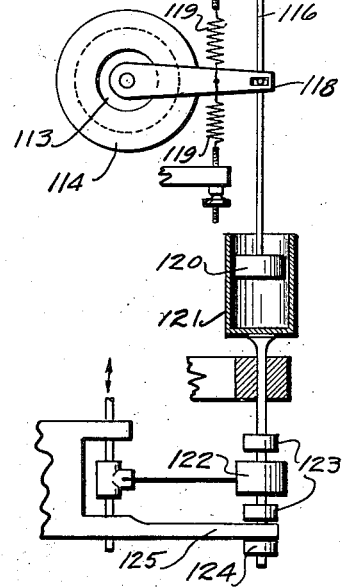
Figure 10 represents a rotary valve vibrated in the direction of its controlling movement, or oscillated, by sharp and short vibrations similar to a hammer action.

In the construction shown by Figure 10 a rotary valve 113 similar to the valve 102 is constantly vibrated or oscillated in the direction of its controlling movement. The valve is mounted in a cylinder 114 and its controlling movement is shown as produced by an electro-magnetic or dynamic device 115 which actuates a rod 116 suspended on a spring 117 and connected to an arm 118 on the valve, the valve being held in normal position by the balancing springs 119. The end of the rod 116 has a plunger 120 thereon mounted in a dash pot 121 containing a suitable damping fluid. The dash pot is shown as constantly vibrated longitudinally with a short, sharp hammer-like action by means of a reciprocating hammer 122 which alternately engages collars 123 rigidly connected to a rod depending from the dash pot 121, which action causes alternate engagement of one of the collars 123 and another collar 124 with a stationary support 125. This rapid reciprocation of the dash pot vibrates the fluid therein which transmits the vibrations through the rod 116 and arm 118 to the valve 113 in the direction of its controlling movement. The dash pot also serves to prevent overthrowing or hunting of the valve in both directions.

Figure 11:
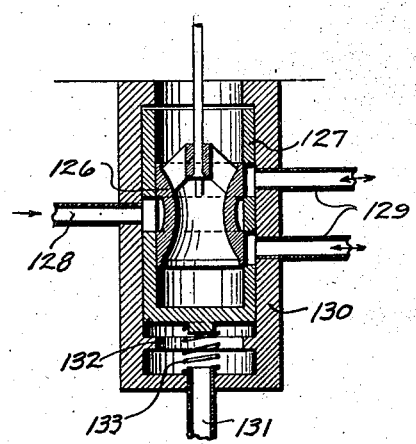
Figure 11 is a sectional view of a governor valve and its cooperating sleeve, showing the sleeve vibrated by fluid vibrations.

Figure 11 illustrates an application of the invention to the sleeve or cylinder cooperating with the governor valve. The valve element 126 is mounted to slide in the sleeve 127 and controls the flow of fluid through inlet pipe 128 and pipes 129. The sleeve 127 is slidably mounted in a cylinder 130 having one end thereof closed, and the corresponding end of the sleeve is also closed. A fluid vibrated by any suitable means is admitted to the cylinder between its closed end and the sleeve through the pipe 131 so as to rapidly vibrate the sleeve axially, movement of the sleeve being limited by the stop shoulder 132. The sleeve is held in normal position by a tension spring 133. The vibrating fluid vibrates the sleeve thereby reducing friction between it and the valve 126.

Figure 12:
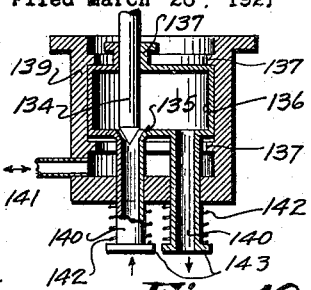
Figure 12 represents another application of the invention in which the controlling element is a needle valve and its seat, the guiding surface of the valve, being vibrated by fluid vibrations.

In Figure 12 the governor valve is a needle valve 134 adapted to cooperate with a seat 135 carried by a hollow piston 136 slidable between stops 137 in the cylinder 139, the valve sliding in a gland 137 in the piston and controlling flow of fluid through pipes 140. The cylinder has a closed end and vibrating or pulsating fluid is admitted behind the hollow piston 136 through a pipe 141. The piston 136 and valve seat 135 may be held in normal balanced position by compression springs 142 interposed between the cylinder and collars 143 on the pipes 140. The vibrating fluid constantly vibrates the piston 136 thereby reducing friction between it and the needle valve 134 sliding therethrough.

Having thus described the invention, what I claim is:

1. A system of the character described comprising a plurality of relatively movable slidably cooperating parts, means for controlling movement of said parts in response to variations in the system under control, and means for causing contact of a vibrating fluid with one of said parts to produce relative vibrations between said slidably cooperating parts in the direction and independently of the controlling movements of said parts.

2. A system of the character described comprising a fluid motor, a controlling element comprising a plurality of slidably cooperating parts movable in response to variations in the system under control for controlling the flow of fluid to said motor, a fluid in contact with one of said parts of the controlling element, and means for vibrating said fluid to produce relative vibrations between the said slidably cooperating parts in the direction and independently of the controlling movements of said parts.

3. A system of the character described comprising a plurality of relatively movable slidably cooperating parts, means for controlling movement of said parts in response to variations in the system under control, a fluid in contact with one of said parts, and means for vibrating said fluid to produce relative vibrations between said slidably cooperating parts, said fluid also preventing overthrowing or hunting of said parts.

4. A system of the character described comprising a movable element, a surface along which said element is adapted to slide, means for controlling movement of said element in response to variations in the system under control, a fluid in contact with said movable element, and means for vibrating said fluid to produce vibrations in said movable element independent of the controlling movement thereof to reduce friction between said element and said surface along which it is adapted to slide, said fluid also preventing overthrowing or hunting of said movable element.

5. A system of the character described comprising a fluid motor, a controlling element comprising a plurality of slidably cooperating parts movable in response to variations in the system under control for controlling the flow of fluid to said motor, a fluid in contact with one of said parts of the controlling element, means for vibrating said fluid to produce relative vibrations between the said slidably cooperating parts, and means for preventing overthrowing or hunting of said slidably cooperating parts of the controlling element and the regulator.

6. A system of the character described comprising a plurality of relatively movable slidably cooperating parts, means for controlling movement of said parts in response to variations in a system under control, means connected to one of said slidably cooperating parts for preventing overthrowing or hunting of said parts, and means for vibrating said last-mentioned means to produce relative vibration of said slidably cooperating parts to reduce friction therebetween.

7. A system of the character described comprising a plurality of relatively movable slidably cooperating parts, means for controlling movement of said parts in response to variations in a system under control, means including a plurality of relatively movable members one of which is connected to one of said plurality of slidably cooperating parts to prevent overthrowing or hunting of said parts, a fluid in contact with one of said members, and means for vibrating said fluid to produce relative vibration of said slidably cooperating parts to reduce friction therebetween.

8. A system of the character described comprising a plurality of relatively movable slidably cooperating parts, means for controlling movement of said parts in response to variations in a system under control, a dash-pot including a relatively movable piston and cylinder one of which is connected to one of said slidably cooperating parts to prevent overthrowing or hunting of said parts, a fluid in said cylinder of said dash-pot, and means for vibrating said fluid to produce relative vibration of said slidably cooperating parts to reduce friction therebetween.

9. A system of the character described comprising a fluid motor, a controlling element comprising a plurality of slidably cooperating parts movable in response to variations in the system under control for controlling the flow of fluid to said motor, a dash-pot including a relatively movable piston and cylinder having a fluid therebetween, one of said piston and cylinder being connected to one of said parts of the controlling element and the other of said piston and cylinder being actuated in accordance with the said motor to prevent overthrowing or hunting of said controlling element, and means for vibrating said fluid in said dash-pot to produce relative vibration of said slidably cooperating parts to reduce friction therebetween.

10. A system of the character described comprising a fluid motor, a governor to control the flow of fluid to said motor including a plurality of slidably cooperating parts, a controlling element for said governor comprising a plurality of slidably cooperating parts movable in response to variations on the system under control one of which is connected to said governor, a fluid in contact with one of said parts of the controlling element, and means for vibrating said fluid to produce relative vibrations between the slidably cooperating parts of both said governor and said controlling element in the direction and independently of the controlling movements of said parts to reduce friction therebetween.

11. A system of the character described comprising a fluid motor, a governor valve and a surface along which it is adapted to slide to control the flow of fluid to said motor, a fluid governor motor to actuate said governor valve, a controlling element for said governor motor to control the flow of fluid thereto and comprising a plurality of slidably cooperating parts, a fluid in contact with one of said parts, and means for vibrating said fluid to produce relative vibrations between said governor valve and the surface along which it is adapted to slide.

ERICH ROUČKA.